United States Patent
Shan et al.

(10) Patent No.: US 8,732,789 B2
(45) Date of Patent: May 20, 2014

(54) PORTABLE SECURITY POLICY AND ENVIRONMENT

(75) Inventors: Eric Shan, Taipei (TW); Anthony Lin, Taipei (TW); Rex Tai, Taipei (TW)

(73) Assignee: Iyuko Services L.L.C., Dover, DE (US)

( * ) Notice: Subject to any disclaimer, the term of this patent is extended or adjusted under 35 U.S.C. 154(b) by 1534 days.

(21) Appl. No.: 11/648,481

(22) Filed: Dec. 28, 2006

(65) Prior Publication Data

US 2007/0283413 A1    Dec. 6, 2007

Related U.S. Application Data

(60) Provisional application No. 60/809,771, filed on May 30, 2006.

(51) Int. Cl.
    *G06F 21/00*    (2013.01)
(52) U.S. Cl.
    USPC ............ 726/1; 726/3; 726/11; 705/2; 705/44
(58) Field of Classification Search
    USPC ...................................... 726/3, 11; 705/2, 44
    See application file for complete search history.

(56) References Cited

U.S. PATENT DOCUMENTS

| 2004/0003190 A1* | 1/2004 | Childs et al. ................... 711/163 |
| 2005/0197859 A1* | 9/2005 | Wilson et al. ...................... 705/2 |
| 2005/0204362 A1* | 9/2005 | Chatterjee et al. ............. 719/318 |
| 2006/0143700 A1* | 6/2006 | Herrmann ........................ 726/14 |
| 2006/0235796 A1* | 10/2006 | Johnson et al. .................. 705/44 |
| 2006/0242685 A1* | 10/2006 | Heard et al. ...................... 726/3 |
| 2008/0040785 A1 | 2/2008 | Shimada |

FOREIGN PATENT DOCUMENTS

| CN | 1276573 A | 12/2000 |
| EP | 1780643 | * 6/2005 |
| IT | WO2007110094 | * 10/2007 |

OTHER PUBLICATIONS

Firoozy-Najafabadi, "Mobile Police Service in Mobile Government", 2011, IEEE, p. 1-5.*

* cited by examiner

*Primary Examiner* — Thanhnga B Truong
*Assistant Examiner* — Gregory Lane

(57) ABSTRACT

The present invention provides a portable security policy and environment, which can accompany a user conveniently, wherever the user goes. The portable security policy and environment involves authenticating the identity of a client end, checking the security environment of the client end, generating policy based on the security environment, and delivering policy to network devices.

12 Claims, 3 Drawing Sheets

PORTABLE SECURITY POLICY AND ENVIRONMENT

This application claims benefit to prior U.S. Provisional Application No. 60/809,771, filed May 30, 2006, which is hereby incorporated herein by reference in its entirety.

FIELD OF THE INVENTION

This invention relates to security policy and environment, and more particularly, to a portable security policy and environment with convenience.

BACKGROUND ART

In a mobile environment, security is a main concern. Different users present different user devices to varying security environments. Since these user devices may not be compatible with the varying security environments, security is typically not implemented. As a result, user devices may not be secure when communicating in a mobile environment.

So this invention provides portable policies and profiles to establish a security environment, wherever the users are, whatever platforms the users use, portable security will go with them, including the portable secure policy and user profile.

And furthermore, this invention covers 3 main parts, Client token, OS security, and Network security.

SUMMARY OF THE INVENTION

The techniques described herein are directed toward network security policy and environment. According to one embodiment of the present invention there is provided a portable security policy and environment for users from an intranet and/or the Internet. The portable security policy and environment comprises a portable device which contains the identity of the user and the default profiles of the user, a client end for inserting the portable device, and a policy server for authenticating the identity of the user, for checking the security environment of the client end, for generating policy for the client end, and for delivering policy to network devices.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Figure 1:
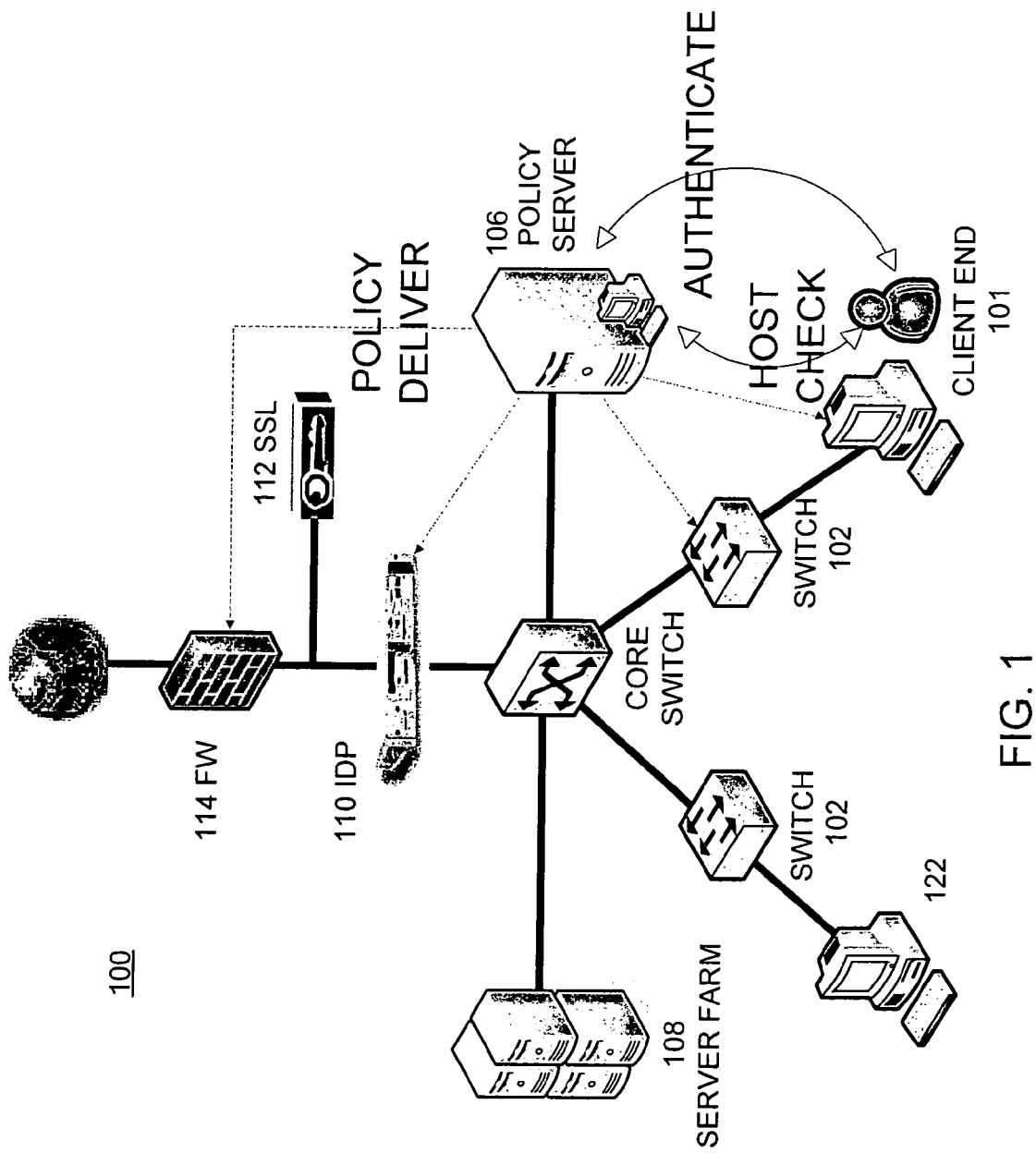
FIG. 1 illustrates a diagram showing a security system which the user logs into in a Local Area Network (LAN), in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention comprise three main parts: client token, OS security, and network security. Embodiments of the present invention use portable policy and profiles to establish a secure environment no matter where a user goes, and no matter what platform the user uses. As such, the portable security will go with the user, including the portable secure policy and user profile. This establishes a convenient and safe security environment.

FIG. 1 illustrates a diagram showing a security system 100 which a user logs into in a Local Area Network (LAN), in accordance with one embodiment of the present invention.

The system 100 provides an integrated way of detecting a health state of an intranet client that attempts to connect to or communicate on a network, and limiting the access of the network client until health policy requirements have been met. The health policy requirements include installed applications, installed patches, configurations, device performance, hardware components and/or the like.

To validate access to a network based on system health, a network infrastructure needs to provide the following areas of functionality: health policy validation, which determines whether computers are compliant with health policy requirements; network access limitation, which limits access for noncompliant computers; automatic remediation, which provides necessary updates to allow a noncompliant computer to become compliant; and ongoing compliance, which automatically updates compliant computers so that they adhere to ongoing changes in health policy requirements.

In a policy-based network, the resources can be allocated by a policy server based on the time of day, client authorization privileges, availability of network resources, and other factors that the network manager may specify when composing the policy. With respect to files and documents, the policy server can allow or deny access, control the extent to which a client can use the document (for example, one-time printing or downloading only), track client use patterns, log changes or modifications, provide automatic updates, eliminate unnecessary redundancy, minimize the need to re-issue documents, and delete outdated data. A policy server can be an important component of networks in which client privacy must be protected (as in medical records) or secrecy maintained (as in military operations).

Referring to FIG. 1, a user from LAN inserts a portable identity (ID) device into a client end 101 to log in. The client end 101 automatically installs a security agent. The security agent automatically enables a network encryption connection. That is, the present embodiment registers the client end 101 into a policy server 106 through one or more service ports which can connect to the outside web (e.g., Internet). The client end 101 may include personal computers, server computers, client devices, routers, switches, wireless access points, security appliances, hand-held or laptop devices, set top boxes, programmable consumer electronics, minicomputers, mainframe computers, or the like.

The security system 100 includes the policy server 106, which is the core device of the security system 100. The policy server 106 provides authorization services and facilitates tracking and control of files. The policy server 106 accepts access control requests, processes them against a formal set of statements that define how the network's resources are to be allocated among its clients (known as the policy), and returns access control responses.

If the client end 101 succeeds at registering into the policy server 106, then the policy server 106 makes the client end 101 pass authentication. That is, the policy server 106 checks the identity of the client end 101.

If the client end 101 passes the authentication, the policy server 106 starts auto downloading a latest checklist. That is, the policy server 106 checks whether the client end 101 meets policy security requirements. More specifically, the policy requirements indicate a computer device status with respect to criteria such as installed applications, installed patches, configurations, device performance, hardware components and/or the like.

The client end 101 automatically downloads the latest security checklist from the policy server 106. Meanwhile, the policy server 106 automatically starts a host check for the client end 101. The host check between the policy server 106 and the client end 101 includes, but is not limited to, the following items: System Patch, anti-virus pattern, file check, process check, local IP, and device check.

The host check is a measure of the trustworthiness of the client end 101. In particular, if the client end 101 is indicative of a healthy state, the request is forwarded to an intended destination. If the client end 101 is indicative of an unhealthy state, the communication traffic of the request may be dropped. In another implementation, if the client end 101 is indicative of an unhealthy state, the request may be filtered or limited according to one or more conventional network provisioning and traffic parameters. In yet another implementation, if the client end 101 is indicative of an unhealthy state, the request may be redirected. The request may be redirected by pushing a source and/or destination device to an appropriate resource for updating the state of the device. For example, a source computing device may be directed to a server where its operating system may be updated with a current security patch.

On the other hand, if the client end 101 matches the security criteria, the policy server 106 dynamically generates a pre-defined client policy based on the identity and environment of the client end 101. The policy server 106 deploys dynamic policy into the client end 101, and network devices such as switches 102, wireless AP, a firewall (FW) 114, an invader protection system (IPS), an intrusion detection and prevention system (IDP) 110, a server farm 108, and the like.

In another embodiment, if the client end 101 fails to connect to the policy server 106, then the client end 101 executes local authentication. If the user passes the local authentication, then the client end 101 loads a default profile and functions. On the other hand, if the client end 101 fails the local authentication, the portable device does not function, or is disabled in one embodiment. In another embodiment, when the client end 101 neither can connect to the policy server 106, nor can pass the local authentication, the policy server 106 will not provide any security protection or execute any security policy.

On the other hand, when the portable device passes the local authentication, then the client end 101 loads the default profile and functions, in one embodiment. In one embodiment, loading is accomplished offline. The default functions (offline mode) in this embodiment include, but are not limited to, user profile (Favorites, File, Desktop), user App tools (mail client, Telnet, SSH, reliable datagram protocol (RDP), etc.), basic policy, anti-phishing, and file encrypted/unencrypted.

Figure 2:
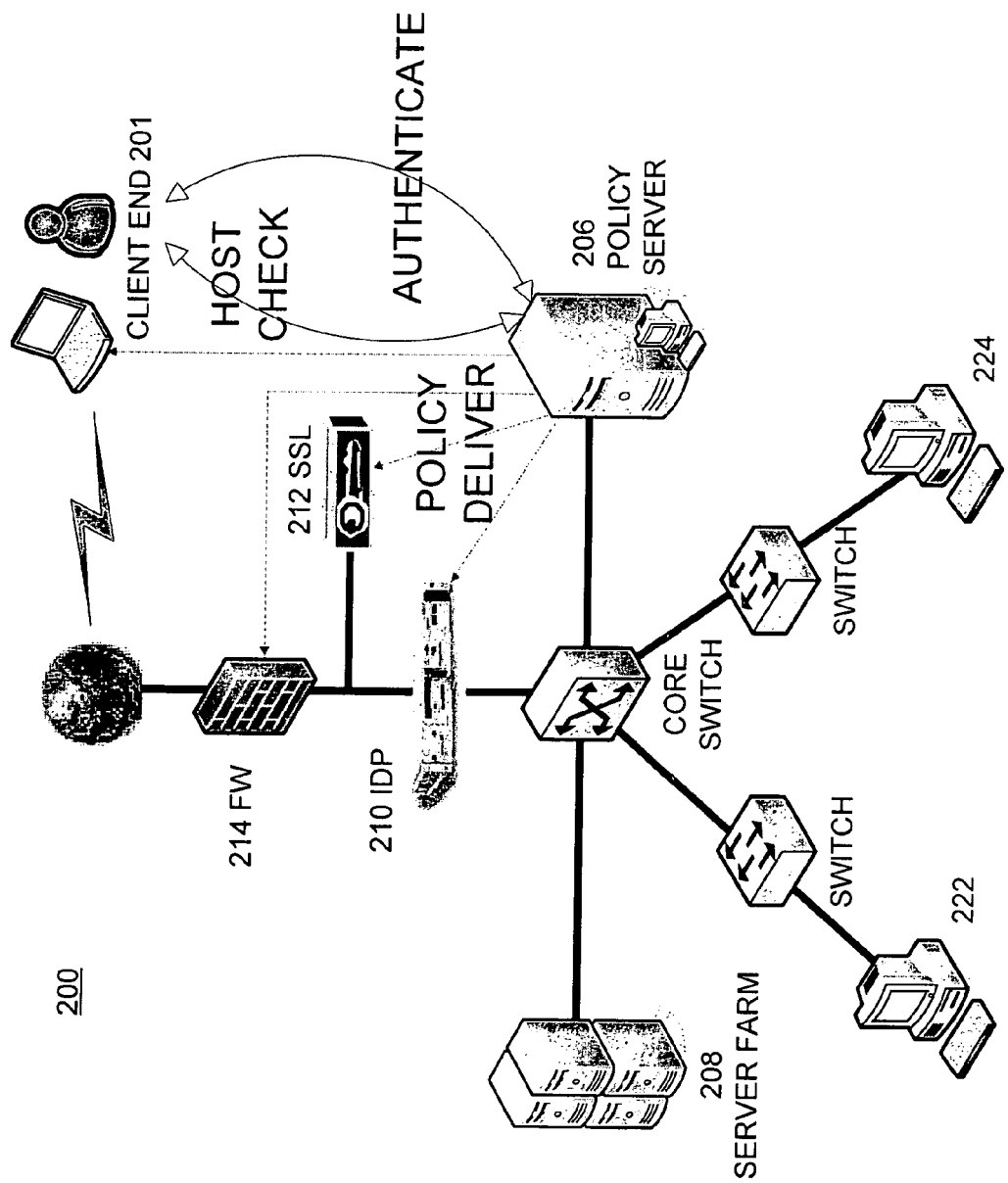
FIG. 2 illustrates a diagram showing a security system which the user logs into in a Wide Area Network (WAN), in accordance with one embodiment of the present invention.

FIG. 2 illustrates a diagram showing a security system 200 which the user logs into in a Wide Area Network (WAN), in accordance with one embodiment of the present invention. The system 200 provides an integrated way of detecting a health state of an Internet client that attempts to connect to or communicate on a network, and limiting the access of the network client until health policy requirements have been met.

A user coupled to a WAN inserts a portable ID device into a client end 201 in order to log in. The client end 201 automatically installs a security agent. The security agent automatically enables a network encryption connection. That is, the present embodiment registers the client end 201 into a policy server 206 through one or more service ports which can connect to the outside web (e.g., Internet). The client end 201 may include personal computers, server computers, client devices, routers, switches, wireless access points, security appliances, hand-held or laptop devices, set top boxes, programmable consumer electronics, minicomputers, mainframe computers, or the like.

The security system 200 includes a policy server 206, which is the core device of the security system 200. The policy server 206 provides authorization services and facilitates tracking and control of files. The policy server 206 accepts access control requests, processes them against a formal set of statements that define how the network's resources are to be allocated among its clients (known as the policy), and returns access control responses.

If the client end 201 succeeds in registering into the policy server 206, then the policy server 206 requires the client end 201 to pass authentication. That is, the policy server 206 checks the identity of the client end 201.

If the client end 201 passes the authentication, the policy server 206 starts auto downloading the latest checklist. That is, the policy server 206 checks whether the client end 201 meets policy security requirements. More specifically, the policy requirements indicate a computer device status with respect to criteria such as installed applications, installed patches, configurations, device performance, hardware components and/or the like.

The client end 201 automatically downloads the latest security checklist from the policy server 206. Meanwhile, the policy server 206 automatically starts a host check for the client end 201. The host check between the policy server 206 and the client end 201 includes, but are not limited to the following items: System Patch, anti-virus pattern, file check, process check, local IP, and device check.

On the other hand, if the client end 201 matches the security criteria, the policy server 206 dynamically generates a predefined client policy based on the identity and environment of the client end 201. The policy server 206 deploys a dynamic policy into the client end 201, switches, wireless AP, a firewall (FW) 214, an IPS/IDP 210, a secure sockets layer encrypts and authenticates (SSL) VPN 212, and the like.

In another embodiment, if the client end 201 fails to connect to the policy server 206, then the client end 201 executes local authentication. If the user passes the local authentication, then the client end 201 loads default profile and functions. On the other hand, if the client end 201 fails the local authentication, the portable device does not function, or is disabled in one embodiment. In another embodiment, when the client end 201 neither can connect to the policy server 206, nor can pass the local authentication, the policy server 206 will not provide any security protection or execute any security policy.

On the other hand, when the portable device passes the local authentication, then the client end 201 loads the default profile and functions, in one embodiment. In one embodiment, loading is accomplished offline. The default functions (offline mode) in this embodiment include, but are not limited to, user profile (Favorites, File, Desktop), user App tools (mail client, Telnet, SSH, RDP, etc.), basic policy, anti-phishing, and file encrypted/unencrypted.

Figure 3:
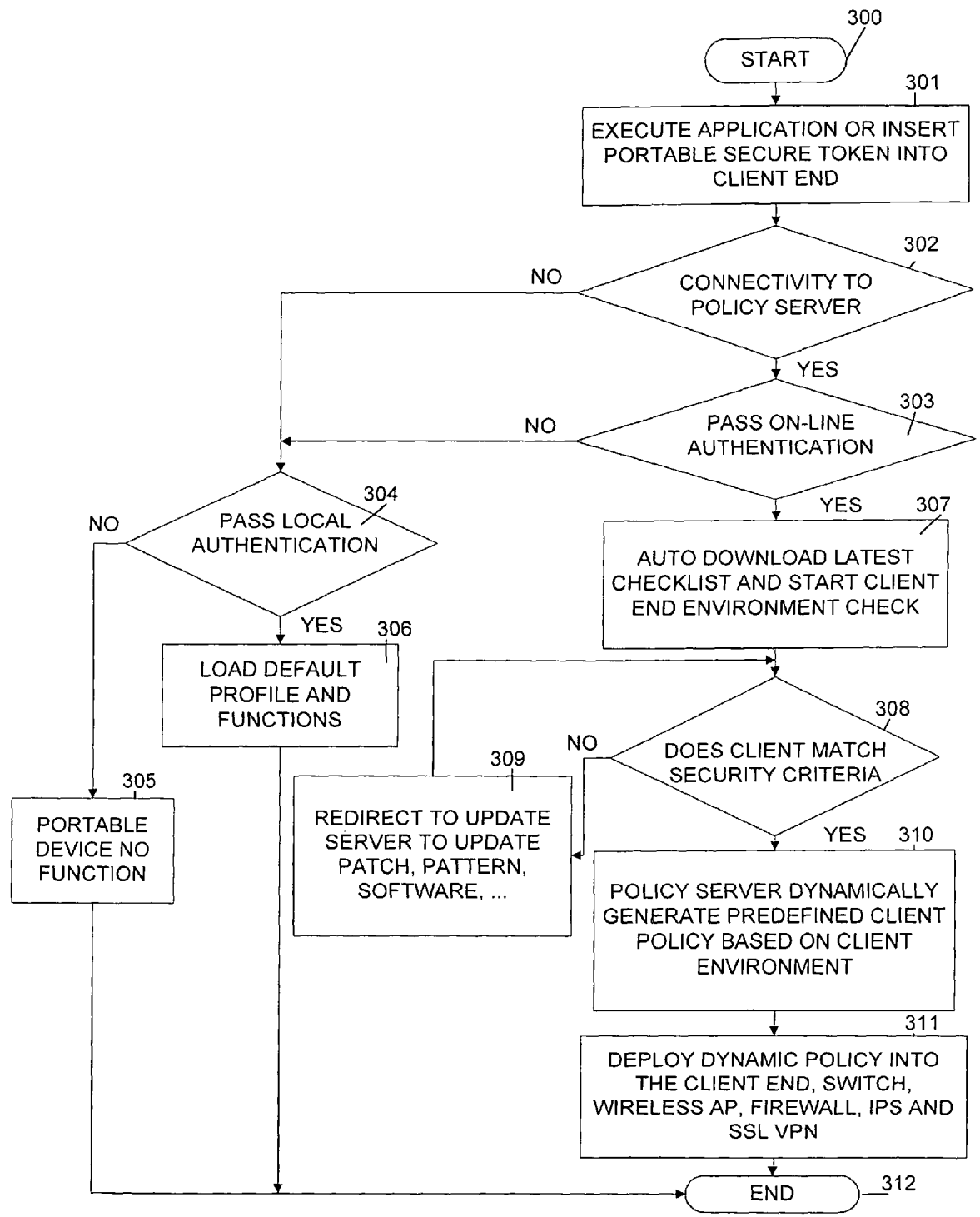
FIG. 3 illustrates a flowchart of examples of operations performed in a portable security environment, in accordance with one embodiment of the present invention.

FIG. 3 illustrates a flowchart of a portable security environment, in accordance with one embodiment of the present invention. A client platform includes, but is not limited to, a desktop, a notebook personal computer (PC), a personal digital assistant (PDA), a mobile phone, a handheld smart card, a universal serial bus (USB) token, etc.

Operation 301 of the flowchart shown in FIG. 3 provides for automatic execution of the mobile security application, in one embodiment. Specifically, in one embodiment, a user inserts a portable ID device into a client end to automatically install a security agent. There are several authentication methods that can be used, such as utilizing identity/password, smart card, USB token, etc., in accordance with embodiments of the present invention.

The flowchart of FIG. 3 includes operation 302 in which the security agent automatically enables a network encryption connection. That is, the present embodiment registers the client end into a policy server (e.g., the policy server 106 in FIG. 1, or the policy server 206 in FIG. 2) through one or more service ports which can connect to the outside web (e.g., Internet).

If the registration into the policy server succeeds, then the present embodiment proceeds to an operation of on-line authentication at 303. On the other hand, if the client end is not able to connect to the policy server, then the present embodiment executes the local authentication at 304.

At 304 of the flowchart in FIG. 3, the present embodiment executes the local authentication. If the user passes the local authentication, then the present embodiment proceeds to 306 to load default profile and functions. On the other hand, if the client end fails the local authentication, then the present embodiment proceeds to 305 where the portable device does not function or is disabled in one embodiment. In another embodiment, when the client device neither can connect to the policy server (e.g., 106 or 206 in FIG. 1 and FIG. 2 respectively), nor can pass the local authentication, the operation 305 will not provide any security protection or execute any security policy.

On the other hand, when the portable device passes the local authentication, then the operation 306 loads the default profile and functions, in one embodiment. In one embodiment, this is accomplished in an offline mode. The default functions (offline mode) in this embodiment include, but are not limited to, user profile (Favorites, File, Desktop), user App tools (mail client, Telnet, SSH, RDP, etc.), basic policy, anti-phishing, and file encrypted/unencrypted.

Referring again to FIG. 3, the flowchart of FIG. 3 includes operation 307 to auto download a latest checklist and start client end environment check if the portable device passes the on-line authentication at 303. At 307, the client end automatically downloads the latest security checklist. Also, the present embodiment automatically starts a client end environment check. The host check between the policy server (e.g., 106 or 206 in FIG. 1 and FIG. 2 respectively) and the client end includes, but is not limited to the following items: System Patch, anti-virus pattern, file check, process check, local IP, and device check.

The flowchart of FIG. 3 includes operation 308 to check whether the client matches the security criteria or not.

If the latest security checklist doesn't match the security criteria, then the present embodiment proceeds to operation 309 and redirects the client end to an update server in order to update System Patch, anti-virus pattern, software, and so on until a match is made. Client update mechanisms include, but are not limited to, Client Patch update, anti-virus pattern update, anti-phishing update, malicious uniform resource locator database (URL DB) update, and agent update, according to embodiments of the present invention. After processing the update procedure, the present embodiment returns to the operation 308 to fulfill basic criteria.

On the other hand, if the security checklist matches the security criteria, then the present embodiment proceeds to operation 310 in which the policy server (e.g., 106 or 206 in FIG. 1 and FIG. 2 respectively) dynamically generates a predefined client policy based on the client environment.

In the operation 310 of the flowchart in FIG. 3, the policy server dynamically generates a predefined client policy based on the client environment. As such, the user policy (e.g., client profile and network ACL) will go with the user, no matter where the user is located. This enables a portable security policy and environment.

The flowchart of FIG. 3 includes operation 311 to deploy dynamic policy into the client end, switches, wireless AP, a firewall, IPS and SSL VPN.

As such, the security policy (e.g., client profile and network ACL) will go with the user, no matter where the user is located. This enables a portable security policy and environment. Also, the policy server can run a virtual platform to make security policy cover all OS including, but not limited to, Windows, Linux/Unix, Apple, and the like. Further, the policy server can include protocol which can make the security policy cover all devices including, but not limited to, Cisco, Microsoft, and the like.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed:

1. A method for providing a portable security environment, comprising:
    enabling a connection between a client end and a policy device by software stored on a portable secure device that is insertable into said client end while said client end remains powered on;
    cooperating with said software to authenticate the identity of said client end according to a status of said connection, wherein said software is executable to cooperate with said policy device to authenticate said identity at said policy device in response to said connection having a successful status, and wherein said software is executable to cooperate with said client end to authenticate said identity at said client end in response to said connection having an unsuccessful status;
    checking a security environment of said client end by said policy device according to a result of said authenticating said identity;
    generating a dynamic client policy for said client end according to a result of said checking, wherein said portable secure device is configured to provide default functions to said client end in response to said identity being authenticated at said client end; and
    wherein said enabling, cooperating, checking, and generating are all performed automatically in response to insertion of said portable secure device into said client end.

2. The method of claim 1, wherein said checking comprises allowing or denying access of said client end.

3. The method of claim 1, wherein said checking comprises downloading a checklist from said policy device if said identity passes the authentication of said client end at said policy device.

4. The method of claim 1, further comprising: redirecting said client end to a resource for updating if said result of said checking indicates that said client end is in an unhealthy state.

5. The method of claim 1, wherein said generating comprises generating said dynamic client policy for said client end if said result of said checking indicates that said client end matches security criteria.

6. The method of claim 1, wherein said portable secure device is inserted into an element that is selected from the group consisting of: a personal computer, a server computer, a router, a switch, a wireless access point, a security appliance, a laptop device, a set top box, a programmable consumer electronic device, a minicomputer, and a mainframe computer.

7. A system, comprising:
    a portable secure device that is insertable into a client end while said client end remains powered on, wherein said portable secure device includes software executable to enable:
        registration of said client end with a policy server if said portable secure device is inserted into said client end;
        authenticating the identity of said client end according to a status of said registration, wherein said software comprises a security agent executable to cooperate with said policy server to authenticate said identity at said policy server if said status of said registration is success, and wherein the security agent is executable to cooperate with said client end to authenticate said identity at said client end if said status of said registration is failure;
        checking a security environment of said client end according to a result of the authentication of said identity; and
        generating a dynamic client policy for said client end according to a result of the checking of said security environment, wherein said portable secure device is configured to provide default functions to said client end if said portable secure device is authenticated at said client end; and
    wherein said portable secure device is configured to cause performance of the enabling of said registration, said authenticating of said identity, the checking of said security environment, and the generating of said dynamic client policy automatically in response to insertion of said portable secure device into said client end.

8. The system of claim 7, wherein said portable secure device is insertable into an element that is selected from the group consisting of: a personal computer, a server computer, a router, a switch, a wireless access point, a security appliance, a laptop device, a set top box, a programmable consumer electronic device, a minicomputer, and a mainframe computer.

9. A method comprising:
    accessing software stored on a portable device that is insertable into a client end while said client end remains powered on; and
    attempting to register said client end with a policy server by executing said software, wherein said software is executable to cooperate with said policy server to authenticate an identity of said client end at said policy server if registration of said client end is successful, wherein said software is executable to cooperate with said client end to authenticate said identity at said client end if registration of said client end is unsuccessful, wherein a security environment of said client end is checked according to a result of the authentication of said identity;
    receiving a dynamic client policy for said client end, wherein said dynamic client policy is generated according to a result of the checking of said security environment, wherein the dynamic client policy provides default functions to said client end if said identity is authenticated at said client end; and
    wherein said registering of said client end with said policy server, the authenticating of said identity, the checking of said security environment, and the generating of said dynamic client policy are all performed automatically in response to insertion of said portable device into said client end.

10. The method of claim 9, further comprising:
    providing said identity to said policy server to be authenticated at said policy server if said registration is successful.

11. The method of claim 1, wherein said software comprises a security agent that controls registration of said client end with said policy device.

12. The system of claim 7, wherein said portable secure device is insertable into a laptop.

\* \* \* \* \*